United States Patent
Uno

(10) Patent No.: US 10,163,362 B2
(45) Date of Patent: Dec. 25, 2018

(54) EMOTION AND MOOD DATA INPUT, DISPLAY, AND ANALYSIS DEVICE

(71) Applicant: CELLREBIRTH LTD., Fukuoka (JP)

(72) Inventor: Hiroyuki Uno, Fukuoka (JP)

(73) Assignee: CELLREBIRTH LTD., Fukuoka (JP)

( * ) Notice: Subject to any disclaimer, the term of this patent is extended or adjusted under 35 U.S.C. 154(b) by 170 days.

(21) Appl. No.: 15/310,891

(22) PCT Filed: May 12, 2015

(86) PCT No.: PCT/JP2015/063680
§ 371 (c)(1),
(2) Date: Nov. 14, 2016

(87) PCT Pub. No.: WO2015/174426
PCT Pub. Date: Nov. 19, 2015

(65) Prior Publication Data
US 2017/0092148 A1    Mar. 30, 2017

(30) Foreign Application Priority Data
May 13, 2014    (JP) ................. 2014-099763

(51) Int. Cl.
*G09B 19/00*    (2006.01)
*G06Q 50/10*    (2012.01)
(Continued)

(52) U.S. Cl.
CPC .......... *G09B 19/00* (2013.01); *G06F 3/0482* (2013.01); *G06Q 50/10* (2013.01); *G06T 11/206* (2013.01); *G09B 5/06* (2013.01); *G06T 2200/24* (2013.01)

(58) Field of Classification Search
CPC .................................................. G06F 3/0482
See application file for complete search history.

(56) References Cited

U.S. PATENT DOCUMENTS 9,104,231 B2 *    8/2015    Roseway ............. G06F 1/1652
9,207,755 B2 *   12/2015    Byrnes ..................... G06F 3/01
(Continued)

FOREIGN PATENT DOCUMENTS

JP    2006-164256 A    6/2006
JP    2008-129805 A    6/2008
(Continued)

OTHER PUBLICATIONS

International Search Report dated Jul. 21, 2015 in corresponding Application No. PCT/JP2015/063680; 1 pg.

*Primary Examiner* — David E Choi
(74) *Attorney, Agent, or Firm* — Maier & Maier, PLLC

(57) ABSTRACT

A feeling of each of members forming a group or team and the mood of all the members felt by each member are objectified and recorded. An emotion/mood data input, display, and analysis device includes a controller, a display, an input unit, and a recording unit. The controller includes an input screen generation unit. The input screen generation unit generates a first input screen that allows each of multiple members forming a group to, as an inputter, input whether an emotion or feeling of the each member is cheerful or gloomy, a level of cheerfulness or gloominess, whether the emotion or feeling is strong or weak, and a level of strength or weakness in a bifurcated manner. The display displays the first input screen. The controller captures data through the first input screen displayed on the display and the input unit and records the data in the recording unit.

2 Claims, 19 Drawing Sheets

(51) Int. Cl.
*G06F 3/0482* (2013.01)
*G06T 11/20* (2006.01)
*G09B 5/06* (2006.01)

(56) References Cited

U.S. PATENT DOCUMENTS

| | | | |
|---|---|---|---|
| 2013/0073578 A1* | 3/2013 | Bland | G06F 17/30781 707/758 |
| 2014/0052731 A1* | 2/2014 | Dahule | G06F 17/30749 707/740 |
| 2015/0025403 A1* | 1/2015 | Chang | A61B 5/165 600/521 |
| 2015/0061824 A1* | 3/2015 | Suzuki | G06F 3/011 340/5.52 |
| 2015/0061825 A1* | 3/2015 | Suzuki | H04W 4/21 340/5.52 |
| 2015/0186780 A1* | 7/2015 | Zhang | G06F 17/30752 706/12 |
| 2015/0213002 A1* | 7/2015 | Gou | G06F 17/2785 704/9 |
| 2017/0092148 A1* | 3/2017 | Uno | G09B 19/00 |

FOREIGN PATENT DOCUMENTS

| | | |
|---|---|---|
| JP | 2008-293369 A | 12/2008 |
| JP | 2012-217518 A | 11/2012 |

* cited by examiner

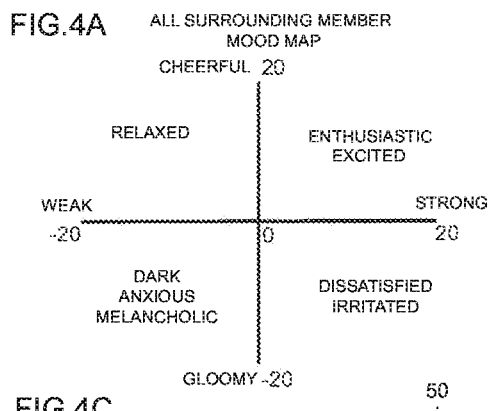
FIG.4A ALL SURROUNDING MEMBER MOOD MAP
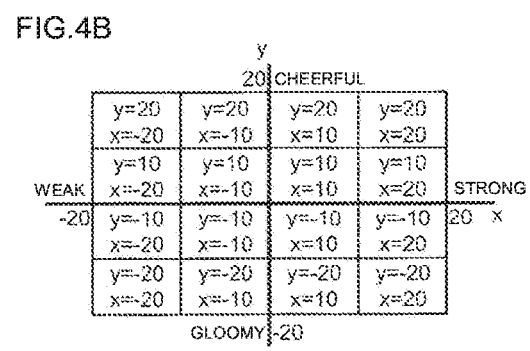
FIG.4B
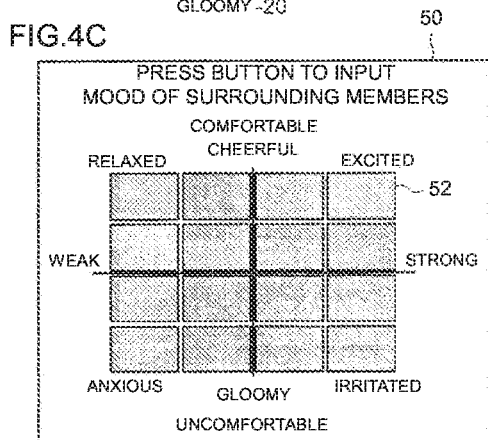
FIG.4C

FIG.5

| | | | | | 54 |
|---|---|---|---|---|---|
| | | | VERY EXCITED (D) | x=20, y=20 | □ 54a |
| | | SOMEWHAT EXCITED (C) | A LITTLE EXCITED | x=10, y=20 | □ 54b |
| | VERY NICE OR VERY COMFORTABLE (B) | SOMEWHAT RELAXED | A LITTLE RELAXED | x=-10, y=20 | □ 54c |
| | | | VERY RELAXED | x=-20, y=20 | □ 54d |
| SOMEWHAT NICE OR COMFORTABLE (A) | | SOMEWHAT EXCITED | VERY EXCITED | x=20, y=10 | □ 54e |
| | A LITTLE NICE OR A LITTLE COMFORTABLE | | A LITTLE EXCITED | x=10, y=10 | □ 54f |
| | | SOMEWHAT RELAXED | A LITTLE RELAXED | x=-10, y=10 | □ 54g |
| SUBJECTIVE INPUT HOW WERE YOU TODAY? | | | VERY RELAXED | x=-20, y=10 | □ 54h |
| | A LITTLE HARD OR A LITTLE UNCOMFORTABLE | SOMEWHAT DISSATISFIED | VERY DISSATISFIED | x=20, y=-10 | □ 54i |
| | | | A LITTLE DISSATISFIED | x=10, y=-10 | □ 54j |
| | | SOMEWHAT ANXIOUS | A LITTLE ANXIOUS | x=-10, y=-10 | □ 54k |
| | | | VERY ANXIOUS | x=-20, y=-10 | □ 54l |
| SOMEWHAT HARD OR UNCOMFORTABLE | | SOMEWHAT DISSATISFIED | VERY DISSATISFIED | x=20, y=-20 | □ 54m |
| | VERY HARD OR VERY UNCOMFORTABLE | | A LITTLE DISSATISFIED | x=10, y=-20 | □ 54n |
| | | SOMEWHAT ANXIOUS | A LITTLE ANXIOUS | x=-10, y=-20 | □ 54o |
| | | | VERY ANXIOUS | x=-20, y=-20 | □ 54p |

FIG.7A

SUBJECTIVE INPUT
HOW WERE YOU TODAY?

- SOMEWHAT NICE OR COMFORTABLE
- SOMEWHAT HARD OR UNCOMFORTABLE

FIG.7B

TO WHAT EXTENT
WERE YOU NICE OR COMFORTABLE?

- VERY NICE OR COMFORTABLE
- A LITTLE NICE OR COMFORTABLE

FIG.7C

WERE YOU EXCITED OR RELAXED?

- SOMEWHAT EXCITED
- SOMEWHAT RELAXED

FIG.7D

TO WHAT EXTENT
WERE YOU EXCITED?

- VERY EXCITED
- A LITTLE EXCITED

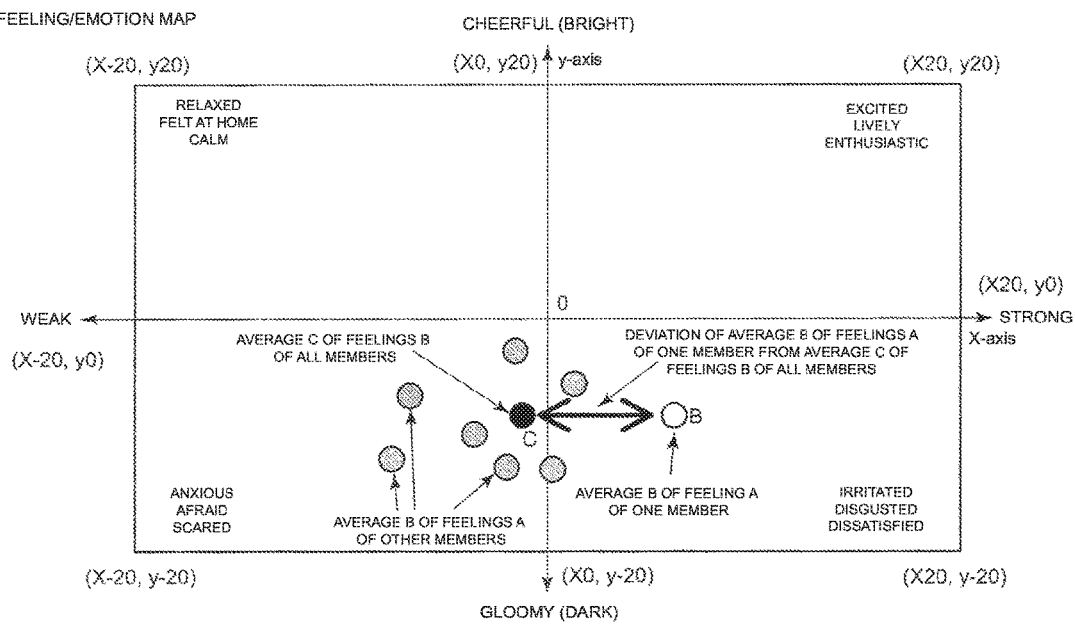

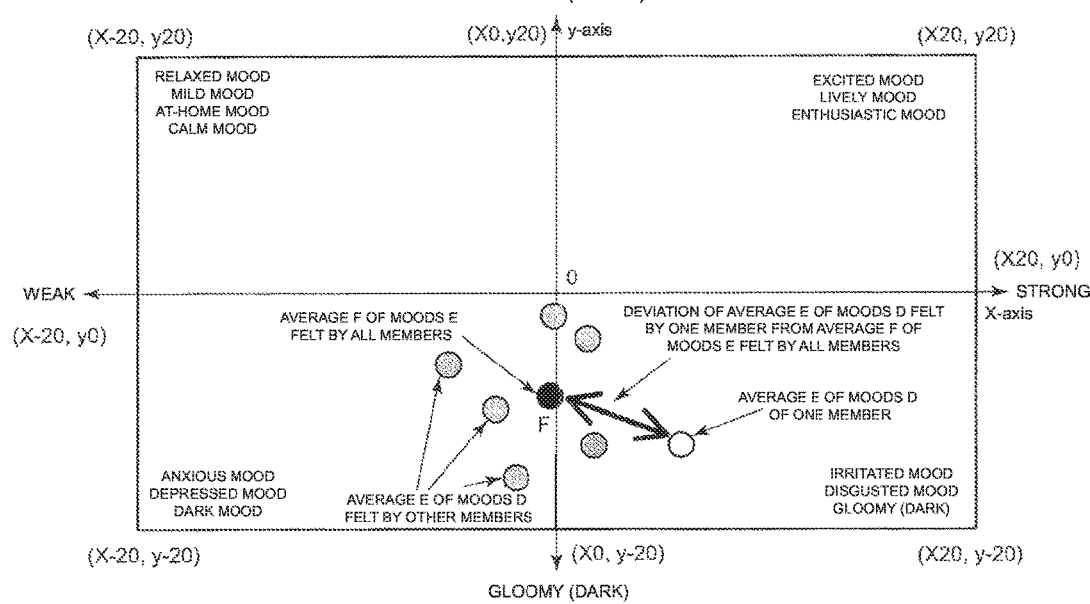

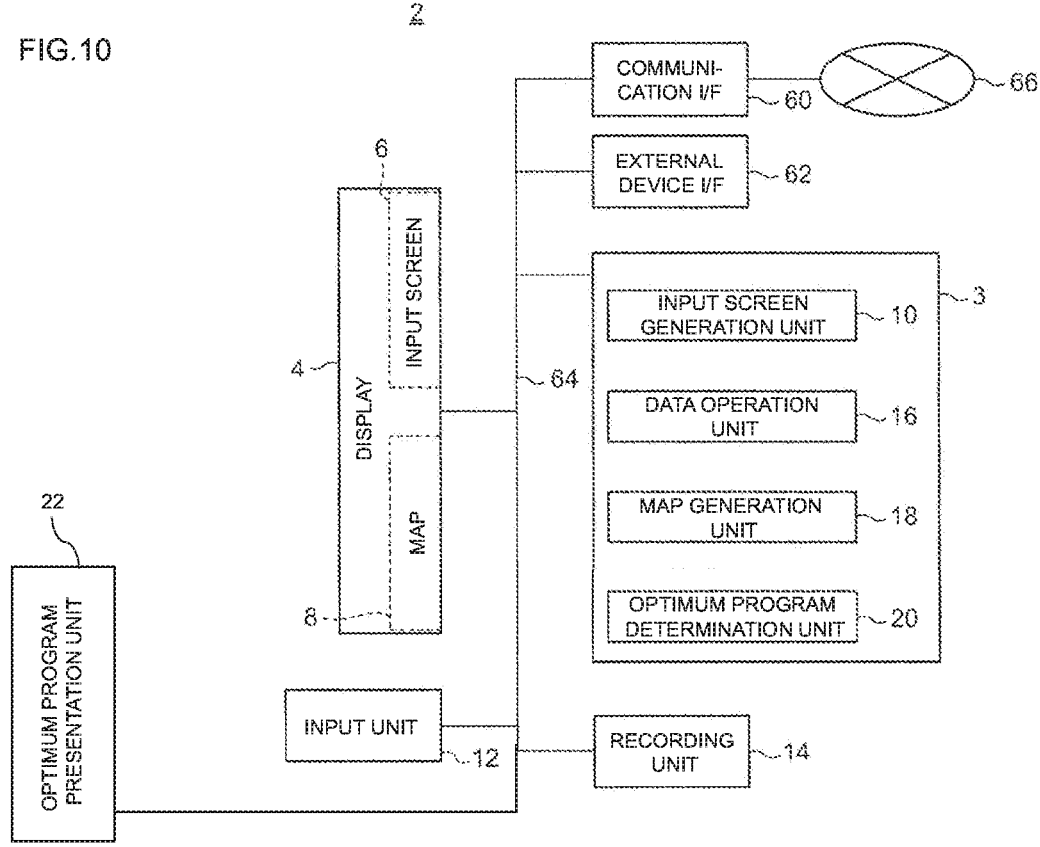

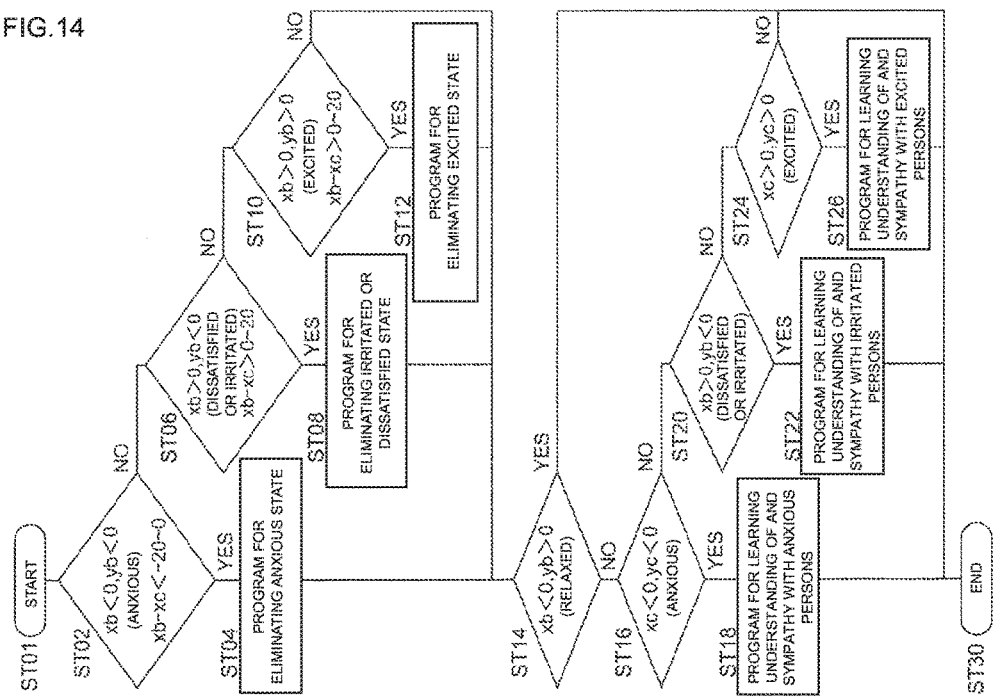

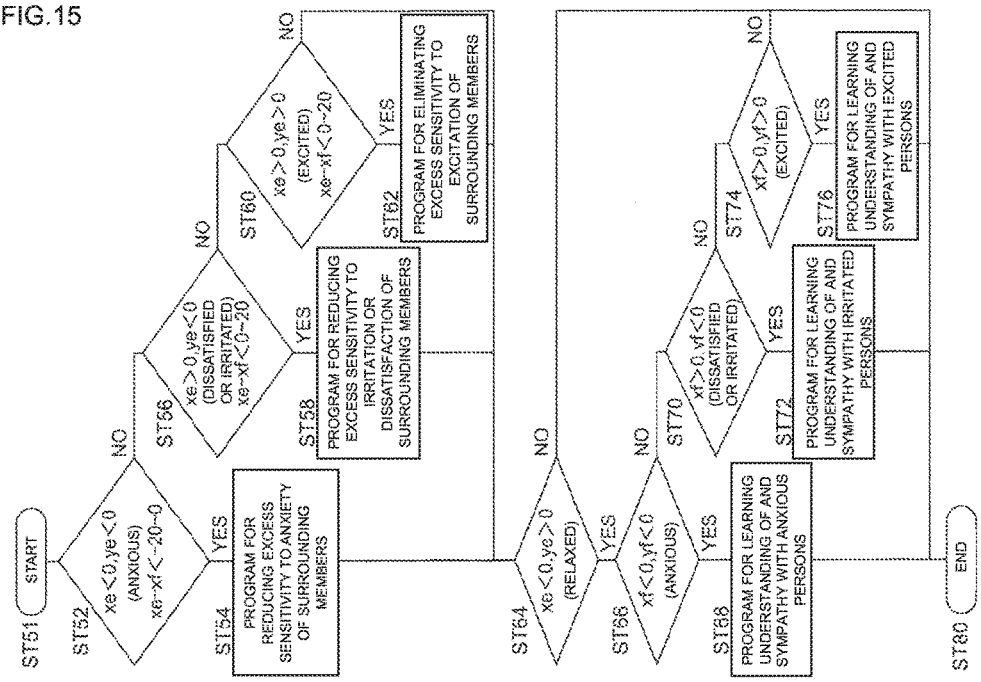

EMOTION AND MOOD DATA INPUT, DISPLAY, AND ANALYSIS DEVICE

TECHNICAL FIELD

The present invention relates to an emotion/mood data input, display, and analysis device.

BACKGROUND ART

In society, many individuals live collectively in a group or team consisting of multiple members, as seen in a home or office. The total of words or deeds expressed on the basis of feelings or emotions of the members of the group forms the mood of the group. The mood is inputted to the brain of each member through his or her sensitivity and then outputted from his or her brain in the form of a feeling or emotion. That is, an emotion (feeling) of each member and the mood (sensitivity) of the surrounding members felt by him or her have an influence on each other.

Each member has his or her own feeling and his or her own sensitivity to the mood of the surrounding members, and the level of the sensitivity varies among members. For this reason, some make excessively sensitive, too high reactions, and others make insensitive, too low reactions. Even when the members of the group set a goal of relaxing the mood of the entire group and live collectively under the goal, it is difficult to objectively check the feeling of each member and how each member is feeling the mood of all the members. Since it is not possible to adjust the different levels of sensitivity of the members to the averaged level, it is difficult to lead emotions of all the members to relaxation and to keep the mood of the entire group relaxed.

Further, as the number of members in the group is increased, or as the number of sections in the group is increased, it is extremely difficult to lead all the group members to relaxation and keep the members relaxed.

As seen above, the sensitivity or feeling of an individual greatly varies among individuals and is ambiguous, and it is difficult for surrounding members to objectively determine the sensitivity or feeling of one member by vision. Accordingly, the sensitivity or feelings cannot be managed by rules or guidance, or compulsorily. Since the sensitivity or feelings of members forming a group are difficult to manage, it is also difficult to keep the mood of the group in a desirable state. Further, since there is no guideline about the sensitivity or the movement of a feeling, each individual has difficulty in adjusting the unevenness of his or her sensitivity by only making his or her own efforts. In the current society, each group manages words, deeds, and attitudes of its members by rules or guidance or compulsorily in order to maintain its living environment. However, as described above, the sensitivity or feeling of each member cannot be regulated or managed by rules or guidance, or compulsorily. Accordingly, each member lives social life while having an irritated or anxious feeling and being managed with respect to only his or her words or deeds. As a result, many members are suffering from the stress of continuously suppressing their unstable feelings and have mental or physical illnesses caused by the accumulation of such stress. This impairs the activities of groups such as corporations and schools and raises the medical cost of the entire society, resulting in social problems.

Patent Literature 1 discloses an attribute evaluation system that can improve evaluation accuracy by dynamically, automatically, and objectively evaluate attributes relating to content or attributes relating to users that access the content. Patent Literature 2 discloses a device that attempts to monitor stress in social life by continuously acquiring biological information from a sensor attached to a human body and performing some processing on the biological information to find the relationship between the information and stress. With regard to a questionnaire-based survey method of Patent Literature 2, it is pointed out that it is not easy to obtain replies from all the questionnaire population and that respondents reply to the questionnaire by their own criteria and therefore produce inaccurate results.

CITATION LIST

Patent Literature

[Patent Literature 1] Japanese Unexamined Patent Application Publication No. 2006-164256
[Patent Literature 2] Japanese Unexamined Patent Application Publication No. 2012-217518

SUMMARY OF INVENTION

Technical Problem

An object of the present disclosure is to objectify and record a feeling of each of members forming a group or team and the mood of all the members felt by each member. Another object of the present disclosure is to objectify a feeling of each of members forming a group or team and the mood of all the members felt by each member and to visually or audibly indicate relatively quantified information. Yet another object of the present disclosure is to automatically determine the feeling of each member of a group or team and whether each member is excessively sensitive, or insensitive, on the basis of the objectified feeling of each member and the objectified mood of all the members felt by each member and can automatically present a program for eliminating the excess sensitivity or insensitivity, if any, on the basis of the determination.

The present invention also aims to objectify and record a feeling of an individual and a conscious word or deed of the individual, to objectify a feeling of an individual and a conscious word or deed of the individual and to visually and audibly indicate relatively quantified information, and to automatically provide a program for automatically determining a feeling of an individual or whether the individual is excessively sensitive, or insensitive, on the basis of the objectified feeling and conscious word or deed of the individual and eliminating the excess sensitivity or insensitivity, on the basis of the determination.

Solution to Problem

The present disclosure provides a data input, display, and analysis device for solving the above problems. A data input, display, and analysis device of the present disclosure includes a controller, a display, an input unit, and a recording unit. The controller includes an input screen generation unit. The input screen generation unit generates a first input screen that allows each of multiple members forming a group to, as an inputter, input whether an emotion or feeling of the each member is cheerful or gloomy, a level of cheerfulness or gloominess, whether the emotion or feeling is strong or weak, and a level of strength or weakness in a bifurcated manner. The display displays the first input screen. The controller captures data through the first input screen displayed on the display and the input unit and records the data in the recording unit Advantageous Effects of Invention The emotion/mood data input, display, and analysis device of the present disclosure can objectify and record the feeling of each member of a group or team and the mood of all the members felt by each member. Also, the emotion/mood data input, display, and analysis device of the present disclosure can objectify the feeling of each member of a group or team and the mood of all the members felt by each member and can visually or audibly indicate relatively quantified information. Further, the emotion/mood data input, display, and analysis device of the present disclosure can automatically determine the feeling of each member of a group or team and whether each member is excessively sensitive, or insensitive, on the basis of the objectified feeling of each member and the mood of all the members felt by each member and can automatically present a program for eliminating the excess sensitivity or insensitivity, if any, on the basis of the determination.

The emotion/mood data input, display, and analysis device of the present disclosure can objectify and record a feeling of an individual and a conscious word or deed of the individual, can objectify a feeling of an individual and a conscious word or deed of the individual and to visually and audibly indicate relatively quantified information, and can automatically provide a program for automatically determining a feeling of an individual or whether the individual is excessively sensitive, or insensitive, on the basis of the objectified feeling and conscious word or deed of the individual and eliminating the excess sensitivity or insensitivity, on the basis of the determination.

BRIEF DESCRIPTION OF THE DRAWINGS

FIG. 4A shows a mood map generated by the emotion/mood data input, display, and analysis device of the first embodiment; FIG. 4B shows an example in which moods are converted into numerical values on the mood map; and FIG. 4C shows an example of an all surrounding member mood data input screen in the emotion/mood data input, display, and analysis device of the first embodiment.

FIG. 5 shows an example of a feeling/emotion data input screen in the emotion/mood data input, display, and analysis device of the first embodiment.

FIGS. 7A and B show some of example feeling/emotion data input screens in the emotion/mood data input, display, and analysis device of the first embodiment.

FIG. 8 shows an example of an emotion map.

FIG. 9 shows an example of a mood map.

FIG. 10 is a block diagram of an emotion/mood data input, display, and analysis device of a second embodiment.

FIG. 14 is a flowchart showing the operation of an optimum program determination unit that determines (selects), for each member, an optimum program for leading a feeling or emotion of the member to relaxation, on the basis of feelings or emotions of all the members displayed on an emotion map.

FIG. 15 is a flowchart showing the operation of the optimum program determination unit that determines (selects), for each member, an optimum program for leading a feeling or emotion of the member to relaxation, on the basis of moods felt by all the members displayed on a mood map.

DESCRIPTION OF EMBODIMENTS

Figure 1:
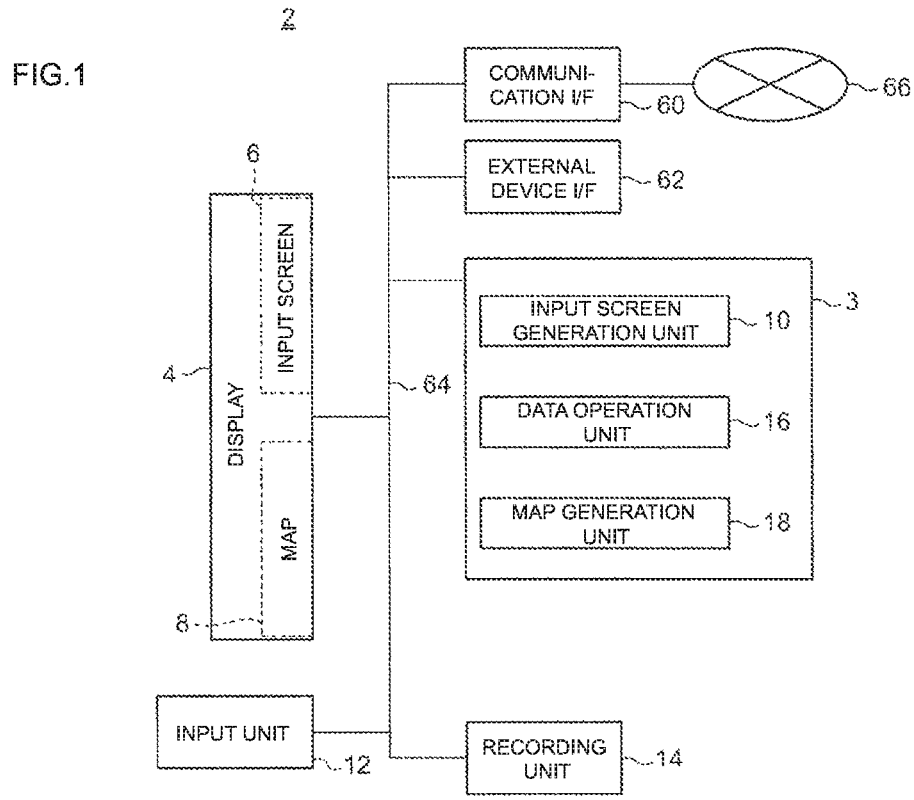
FIG. 1 is a block diagram of an emotion/mood data input, display, and analysis device of a first embodiment.

Now, embodiments will be described in detail with reference to the accompanying drawings. However, detailed description more than necessary may be omitted. For example, detailed description of already known matters or repeated description of substantially the same configuration may be omitted. This is intended to avoid the description below from becoming unnecessarily redundant and to facilitate the understanding of the description by those skilled in the art.

The inventor provides the accompanying drawings and the description below so that those skilled in the art sufficiently understand the present disclosure and therefore does not intend to limit the subjects in the claims using those.

Circumstances Leading to Embodiments

In society, many individuals live collectively in a group or team consisting of multiple members, as seen in an office, school, or home. The members of a group have their own feelings or emotions and different levels of sensitivity. Accordingly, it is difficult to match the levels of sensitivity of all the members.

There are members who have excessively high levels of sensitivity and thus have unstable feelings. When such a member has a negative feeling such as anxiety or irritation, he or she would give stress to the surrounding members. On the other hand, there are members who have excessively low levels of sensitivity. Such a member may be giving uncomfortable stress to the surrounding members even when he or she believes that he or she lives collectively with no malice.

In most cases, each member of a group cannot objectively know whether he or she is overestimating himself or herself due to his or her excessively high level of sensitivity compared to average members of the group or underestimating himself or herself due to his or her excessively low level of sensitivity compared to average members in the group, but rather lives with patience while feeling anxiety or dissatisfaction or causing others to have such feelings. Such continuous patience results in chronic, social interpersonal stress, which then damages mental or physical health of many members and causes many chronic ailments, including psychosomatic diseases and social troubles. These circumstances impair the health of the members, as well as prevent corporations or families from functioning through teamwork and reduce the team efficiency. These circumstances also lead to a problem of increasing various costs of corporations, municipalities, national government, and health insurance societies, including the salary of staff incapable of working due to ailments and the social security cost required by the treatment.

The total of words and deeds outputted on the basis of feelings or emotions of the members forms the mood of the group. An emotion (feeling) of one member and the mood of the surrounding members felt by the one member have an influence on each other through words or deeds of the members involved, that is, have a correlation. Each member has his or her own feeling and his or her own sensitivity to the mood of the surroundings, and the level of the sensitivity varies among members. For this reason, some make excessively sensitive, too high reactions, and others make insensitive, too low reactions.

As a result, it is difficult to lead the emotions of all the members forming the group to relaxation and to keep the mood of all the members relaxed. This is because even if the members sets a goal of relaxing the mood of the entire group and live collectively under the goal, it is not possible to objectively (e.g., visually) check the feeling of each member and how each member is feeling the mood of all the members. This is also because it is not possible to adjust the different levels of sensitivity of the members to the averaged level.

Further, as the number of the members of the group is increased, or as the number of sub-groups forming the group is increased, it is extremely difficult to lead all the members of the group to relaxation and keep the members relaxed.

Figure 16A:
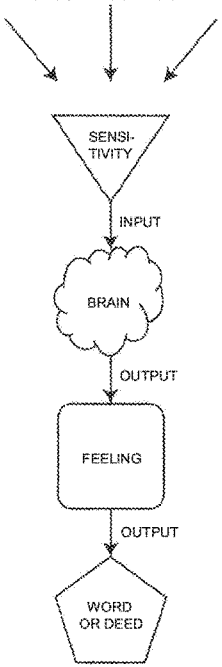
FIGS. 16A and B are schematic diagrams showing the relationship among the sensitivity, brain, feeling, and word or deed of the members of a group.

The brain of an individual has a sensitivity reception function of receiving a mood through the five senses and a feeling output function of outputting a feeling that occurs in the brain. The reception of a mood through the sensitivity has an influence on the output of a feeling, and a word or deed is changed in response to this feeling and then outputted. For example, one individual receives, as a "mood," an uncomfortable stimulus based on his or her living environment or his or her own word or deed through his or her sensitivity. In response, the individual outputs an anxious or uncomfortable feeling. More specifically, the individual expresses the anxious or uncomfortable feeling as a word, facial expression, or attitude and outputs it. On the other hand, when the individual receives a comfortable environment as a "mood" through his or her sensitivity, he or she gets a relaxed feeling in response and outputs a gentle word or deed. FIG. 16A is a schematic diagram showing the relationship among the sensitivity, brain, feeling, and word or deed of one member of a group as described above.

Figure 16B:
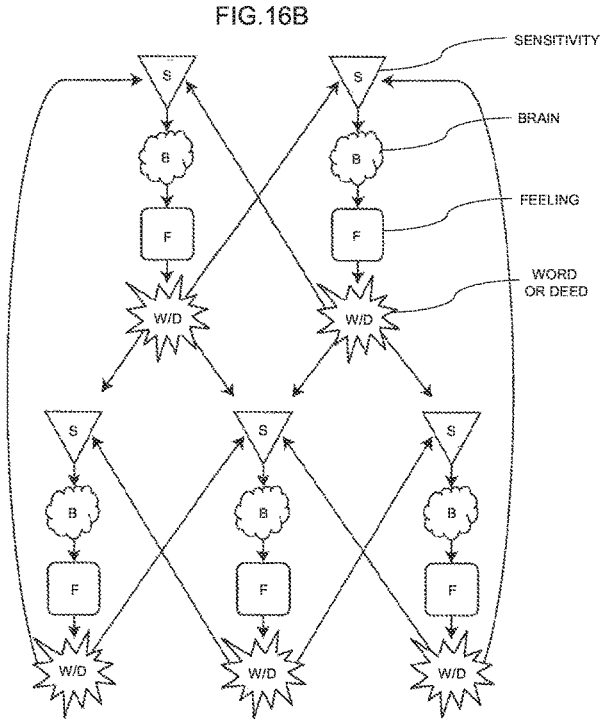

Assuming that two or more individuals live collectively in a group, a word or deed outputted by one member on the basis of his or her feeling acts as the surroundings of another member and is inputted to the brain of the other member through the sensitivity thereof [see FIG. 16B]. As described above, the level of sensitivity varies among individuals, and there are individuals who have too high levels of sensitivity, that is, are excessively sensitive and individuals who have too low levels of sensitivity, that is, are insensitive. The level of sensitivity to the input has an influence on a feeling to be outputted. Accordingly, even if individuals live in a group in the same environment, each member outputs a different feeling as a response on the basis of his or her own sensitivity.

There are individuals who are more likely to express their feelings as facial expressions or words or deeds and individuals who are less likely to express their feelings as facial expressions or words or deeds. Further, as described above, the level of the sensitivity to the mood varies among individuals. For these reasons, it is difficult to objectively know the actual feeling output situation or sensitivity input situation of each member of a group. Daring to do so requires conducting history taking or psychological test on each member. However, it is difficult to everyday continuously investigate the feeling output situation or sensitivity input situation with respect to groups, which change in daily social life.

It is also difficult for each member to accurately memorize the past long-term feeling output situation or sensitivity input situation and temporal changes in the situation and to objectively evaluate the long-term changes.

Assuming that the members of a group live collectively, the members output words or deeds on the basis of their feelings and receive the mood of the words or deeds through their sensitivity, and the received mood further influences their feelings [see FIG. 16B]. When one member outputs an uncomfortable feeling in the form of an uncomfortable word or deed, another member receives an uncomfortable stimulus through his or her sensitivity and expresses an anxious or uncomfortable feeling as a word or deed. This is a vicious circle. In other words, the mood of the living environment deteriorates, and environmental stress increases. As seen above, if the members work or live collectively for a long time in a stress-increasing environment, more members accumulate stress and increase each other's stress, forming a vicious circle. As a result, various stress-related mental and physical ailments occur. That is, when one member suffers stress in collective life, there exists, as a backdrop, a vicious circle related to the levels of sensitivity of the other members to the input of a stimulus or the levels of output of feelings of the other members, and it is difficult to eliminate the influence of the other members on this stress. Accordingly, it is very difficult for each member to adjust his or her feeling or sensitivity on his or her own to reduce stress.

A feeling or emotion of an individual cannot be seen unlike a word or deed or evaluated objectively and therefore cannot be managed by rules or penalties. Also, a feeling or emotion of an individual occurs on the basis of his or her sensitivity, and the sensitivity varies among individuals. Since it is not possible to objectively know the sensitivity of other individuals, it is not possible for the members of a group to objectively recognize their feelings or emotions by rules or guideline and to manage their feelings or emotions under predetermined rules. For this reason, in typical collective social life, only words or deeds are regulated or managed by rules, penalties, or manners so that each member does not bother the surrounding members. In this way, efforts are being made to improve the collective living environment as much as possible.

While conscious words and deeds can be managed under rules to some extent, a word or deed outputted by an individual unconsciously cannot be controlled by the individual and therefore cannot be managed under rules. Specifically, an individual who unconsciously outputs words or deeds uncomfortable for the surrounding individuals must receive guidance; however, it is difficult for the individual to manage his or her words or deeds due to his or her lack of awareness even if he or she receives guidance. As a result, this individual repeatedly receives the same guidance. This approach places a large burden on both individuals who give guidance and the individual who is given guidance and tends to deteriorate the relationship between the individuals involved rather than improving it.

Assume that one member, despite having an unstable feeling, consciously restricts only his or her words or deeds under the rules of the group or a deed conducted by the individual unconsciously against the rules is corrected by others. In this case, this member must endure the unstable mental state, as well as must continuously suffer the stress of refraining from or being forced to refrain from outputting a word or deed, thereby making him or her emotionally more unstable. This is a vicious circle. As a result, not only this member but also the surrounding members bear a mental or physical burden [see FIG. 16B].

Figure 17:
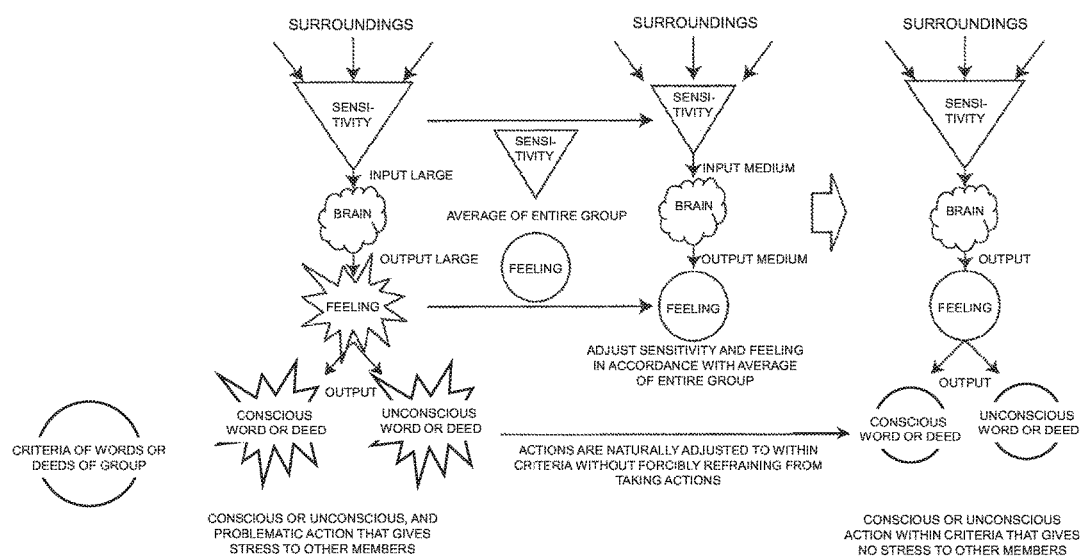
FIG. 17 is a schematic diagram showing an aspect in which the sensitivity, feeling, and word or deed of the members of a group are adjusted.

A device of the present embodiment is a system for solving the above problem. The device of the present embodiment periodically inputs varying sensitivity (mood) and feelings (emotions) under predetermined rules in order to improve the emotional environments of one member and the surrounding members living in a group, converts the sensitivity and feelings into numerical values, and illustrates the numerical values so that the sensitivity and feelings can be visually checked. As a result, the one member can compare his or her numerical values with the average values of all the members to check the deviation of his or her sensitivity and feeling. Also, all the members improve their emotional environments by conducting learning in cooperation with each other so that the feeling (emotion) of each member is stabilized. By improving the emotional environments, each member can naturally improve his or her words or deeds under the rules of the group without having to forcibly refrain the output of words or deeds. FIG. 17 is a schematic diagram showing the aspect in which the device of the present embodiment favorably adjusts sensitivity, feelings, and words or deeds in the group.

The device of the present embodiment converts the feeling of each member and the mood of all the members felt by each member into numerical values and visually displays the numerical values on a display. Thus, the device assists each member in leading his or her emotion to relaxation while checking the position of his or her feeling and the mood felt by him or her in the entire group. Also, the device of the present embodiment converts the feeling of each member and the mood of all the members felt by each member into numerical values, automatically determines the feeling of each member and whether each member is excessively sensitive, or insensitive, by using the deviation of the numerical value of each member from the average of the numerical values of all the members as an indicator, and automatically presents an applicable member with a program (e.g., text, voice, moving images) for eliminating the excess sensitivity or insensitivity, as necessary.

If the one member actively makes efforts to lead his or her emotion to "relaxation" on an emotion map or mood map using the device of the present embodiment, environments in which the other members can be relaxed are generated. That is, by using the device of the present embodiment, each member of the group can have a common goal of relaxing other members by actively relaxing himself or herself rather than having himself or herself relaxed by others. Specifically, the device of the present embodiment displays feelings or emotions of all the members and the moods felt by all the members (on the basis of their sensitivity) on an emotion map or mood map and causes each member to make efforts using this display so that his or her emotion is led to relaxation. Thus, the device of the present embodiment allows all the members to lead their emotions and moods to "relaxation" through teamwork and keep them relaxed.

First Embodiment

[1-1] Configuration of Emotion/Mood Data Input, Display, and Analysis Device

FIG. 1 is a block diagram of an emotion/mood data input, display, and analysis device of a first embodiment. An emotion/mood data input, display, and analysis device 2 shown in FIG. 1 includes a controller (processor) 3, a display 4, an input unit 12, a recording unit 14, a communication interface 60, and an external device interface 62. The controller (processor) 3 performs arithmetic operations and controls the entire device including the display 4, input unit 12, recording unit 14, communication interface 60, and external device interface 62. The display 4 displays operation results obtained by the controller (processor) 3 and the like and consists of a liquid crystal display, organic EL display, plasma display, or the like. The input unit 12 generates or receives data to be inputted to the device and typically consists of a keyboard, mouse, touchscreen, or the like. Note that an input screen 6 (to be discussed later) is displayed on the display 4 and serves as data input means. The recording unit 14 is a unit in which programs run by the controller (processor) 3, input data, data required to generate maps, and the like are recorded. The communication interface 60 serves as an interface with an external network 66. The external device interface 62 serves as an interface with an external device such as a printer. The processor (controller) 3, display 4, input unit 12, recording unit 14, communication interface 60, and external device interface 62 are connected to each other through an appropriate bus 62. The emotion/mood data input, display, and analysis device 2 consists of an information processing device, such as a desktop personal computer, notebook personal computer, workstation, tablet terminal, or smartphone.

In the emotion/mood data input, display, and analysis device 2 of the first embodiment shown in FIG. 1, the controller 3 includes an input screen generation unit 10, a data operation unit 16, and a map generation unit 18. The input screen generation unit 10, data operation unit 16, and map generation unit 18 are implemented by the collaboration between the processor, which is a hardware resource, and a program recorded in the recording unit, which is software.

The display 4 displays input screens shown in FIGS. 3(3), 4(3), 5, 6, 7(1), 7(2), 7(3), and 7(4) and maps (an emotion map, a mood map) 8 shown in FIGS. 8 and 9. The input screen generation unit 10 generates input screens to be displayed on the display 4.

Data inputted on the basis of an operation on the input screen 6 and data inputted from the input unit 12 are recorded in the recording unit 14.

Figure 2:
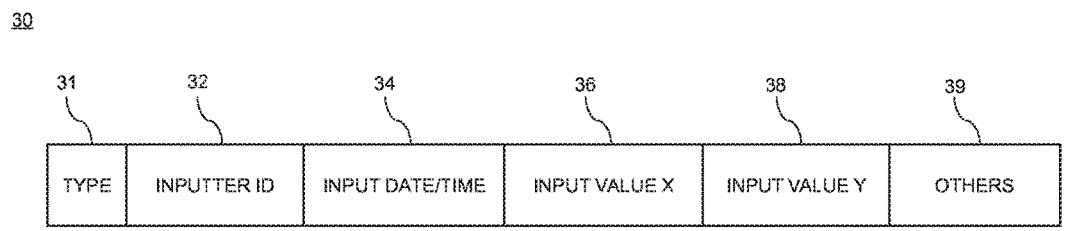
FIG. 2 shows the record format of data recorded in a data recording unit of the emotion/mood data input, display, and analysis device.

Data inputted on the basis of an operation on the input screen 6 of the emotion/mood data input, display, and analysis device 2 of the first embodiment is in a record format as shown in FIG. 2. Specifically, input data of the first embodiment includes a type, an inputter ID (identifier), an input date/time, an input value x, an input value y, and others. "Others" include, for example, data such as an input (computer) terminal ID. "Type," "input value x," and "input value y" will be described later.

The data operation unit 16 performs an arithmetic operation on data inputted through the input screen 6 or input unit 12 and recorded in the recording unit 14. The map generation unit 18 generates maps (an emotion map, a mood map) 8 (to be discussed later) on the basis of data resulting from the arithmetic operation by the data operation unit 16 and displays them on the display 4.

[1-2] Configurations of Emotion Map and Mood Map

Figure 3A:
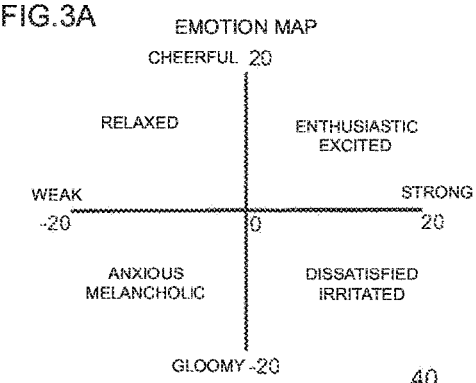
FIG. 3A shows an emotion map generated by the emotion/mood data input, display, and analysis device of the first embodiment.
Figure 3B:
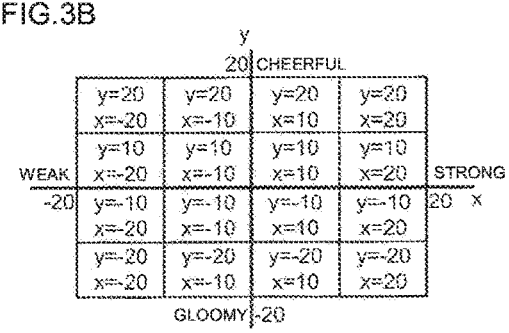
FIG. 3B shows an example in which feelings or emotions are converted into numerical values on the emotion map.

FIG. 3A is a diagram showing the basic configuration of an emotion map of the first embodiment. FIG. 4A is a diagram showing the basic configuration of a mood map of the first embodiment. The "emotion map" and "mood map" serve as the base of an input screen and output screen of the present embodiment.

The configurations of the "emotion map" and "mood map" will be described. In the "emotion map" and "mood map," the y-axis indicates whether an emotion or mood is cheerful or gloomy. Specifically, the positive side of the y-axis indicates that an emotion or mood is "cheerful," and the negative side of the y-axis indicates that an emotion or mood is "gloomy." In the "emotion map" and "mood map," the x-axis indicates whether an emotion or mood is strong or weak. Specifically, the positive side of the x-axis indicates that an emotion or mood is "strong," and the negative side of the x-axis indicates that an emotion or mood is "weak."

Accordingly, the "emotion map" and "mood map" show emotions or moods as described below:

The emotion or mood is "excited" ("enthusiastic") when it has a positive x-axis value and a positive y-axis value;

The emotion or mood is "relaxed" when it has a negative x-axis value and a positive y-axis value;

The emotion or mood is "anxious" ("melancholic") when it has a negative x-axis value and a negative y-axis value; and The emotion or mood is "dissatisfied" ("irritated") when it has a positive x-axis value and a negative y-axis value.

Further, in the "emotion map" and "mood map," the levels of "cheerfulness" and "gloominess" of the y-axis and the levels of "strength" and "weakness" of the x-axis are each converted into multiple-step numerical values and developed. Specifically, in the "emotion map" and "mood map" shown in FIGS. 3(2) and 4(2), the levels of "cheerfulness" and "gloominess" of the y-axis and the levels of "strength" and "weakness" of the x-axis are each converted into two-step numerical values and developed.

More specifically, the level of "cheerfulness" of the y-axis is converted into two-step numerical values, $y=10$ and $y=20$, and developed; the level of "gloominess" of the y-axis is converted into two-step numerical values, $y=-20$ and $y=-10$, and developed; the level of "strength" of the x-axis is converted into two-step numerical values, $x=10$ and $x=20$, and developed; and the level of "weakness" of the x-axis is converted into two-step numerical values, $x=-20$ and $x=-10$, and developed. Of course, in the "emotion map" and "mood map," the levels of "cheerfulness" and "gloominess" of the y-axis and the levels of "strength" and "weakness" of the x-axis may be converted into multiple-step numerical values different from those in FIGS. 3(2) and 4(2) and developed.

As shown in FIGS. 3(3) and 4(3), 16 input buttons are provided on each of an example feeling/emotion data input screen (emotion map) and an example all surrounding member mood data input screen (mood map) so as to correspond to the levels of "cheerfulness" and "gloominess" of the y-axis and the levels of "strength" and "weakness" of the x-axis, which are each converted into the two-step numerical values. Specifically, input buttons indicating coordinates $(x=10, y=10)$, $(x=20, y=10)$, $(x=20, y=20)$, $(x=10, y=20)$, $(x=-10, y=10)$, $(x=-10, y=10)$, $(x=-20, y=20)$, $(x=-20, y=10)$, $(x=-10, y=-10)$, $(x=-20, y=-10)$, $(x=-20, y=-20)$, $(x=-10, y=-20)$, $(x=10, y=-10)$, $(x=10, y=-20)$, $(x=20, y=-20)$, and $(x=20, y=-10)$ are provided.

[1-3] Operation of Emotion/Mood Data Input, Display, and Analysis Device

The operation of the emotion/mood data input, display, and analysis device of the present embodiment will be described. One member inputs data about his or her feeling or emotion when he or she is present in the group, to the input screen 6 shown in FIG. 3C displayed on the display 4 on the basis of his or her point of view. Specifically, the one member clicks one of the 16 input buttons on the input screen 6 in FIG. 3C using the data input unit 12 in accordance with the level of "cheerfulness" or "gloominess" and the level of "strength" or "weakness" of his or her feeling or emotion when he or she is present in the group, on the basis of his or her point of view.

When the one member inputs the data, the following data is stored in the recording unit 14 as shown in FIG. 2: the inputter ID and the input date/time are stored in the items "inputter ID" and "input date/time; a code indicating that the data is data about a feeling or emotion is stored in the item "type"; and numerical cheerfulness/gloominess data and strength/weakness data (one of $x=\pm 10$, $\pm 20$, $x=\pm 10$, and $\pm 20$) about the feeling or emotion are stored in the items "input value x" and "input value y." These pieces of data constitute an input record.

The one member inputs data about the mood of the surrounding members felt by him or her (that is, data about the sensitivity) to the input screen 6 shown in FIG. 4C displayed on the display 4, on the basis of his or her point of view. Specifically, the one member clicks one of the 16 input buttons on the input screen 6 in FIG. 4C using the data input unit 12 in accordance with the level of "cheerfulness" or "gloominess" and the level of "strength" and "weakness" of the mood of all the surrounding members felt by him or her (that is, the sensitivity received from all the surrounding members), on the basis of his or her point of view.

When the one member inputs the data, the following data is stored in the recording unit 14 as shown in FIG. 2: the inputter ID and the input date/time are stored in the items "inputter ID" and "input date/time"; a code indicating that the data is data about the mood (sensitivity) is stored in the item "type"; and numerical cheerfulness/gloominess data and strength/weakness data (one of $x=\pm 10$, $\pm 20$, $x=\pm 10$, and $\pm 20$) about the mood are stored in the items "input value x" and "input value y." These pieces of data form an input record.

As seen above, the following data is inputted at any predetermined time intervals. (a) data about the feeling or emotion of the one member when he or she is present in the group, based on his or her point of view (hereafter referred to as a "subjective information value"), and (b) data about the mood of all the surrounding members felt by the one member (that is, the sensitivity received from all the surrounding members) based on his or her point of view (hereafter referred to as an "objective information value")

For example, the data (a) and data (b) are inputted when the member leaves the office (if the group is an office), when the member leaves the school (if the group is a school), or when the member goes to bed (if the group is a family).

After all the group members input subjective information values A (xa, ya) and objective information values D (xd, yd) in a predetermined period, the data operation unit 16 calculates the average value B of a predetermined number (e.g., five for five days, seven for seven days) of subjective information values A and the average value E of the predetermined number of objective information values D.

For example, the average value B (xb, yb) of five subjective information values A (xa, ya) for five days is calculated as follows:

$$xb=(xa1+xa2+xa3+xa4+xa5)/5$$

$$yb=(ya1+ya2+ya3+ya4+ya5)/5$$

Further, the average value C (xc, yc) of the subjective information values B (xb, yb) of all the group members is obtained. For example, the average value C (xc, yc) of the subjective information values B (xb, yb) of six members is obtained as follows:

$$xc=(xb1+xb2+xb3+xb4+xb5+xb6)/6$$

$$yc=(yb1+yb2+yb3+yb4+yb5+yb6)/6$$

Similarly, the average value E (xe, ye) of a predetermined number of objective information values D (xd, yd) inputted as data about the mood of all the surrounding members felt by the one member is obtained. For example, the average value E (xe, ye) of five objective information values D (xd, yd) for five days of the one member is calculated as follows:

$$xe=(xd1+xd2+xd3+xd4+xd5)/5$$

$$ye=(yd1+yd2+yd3+yd4+yd5)/5$$

Further, the average F (xf, yf) of the objective information values E (xe, ye) of all the group members is obtained. For example, the average F (xf, yf) of the objective information values E (xe, ye) of six members is obtained as follows:

$$xf=(xe1+xe2+xe3+xe4+xe5+xe6)/6$$

$$yf=(ye1+ye2+ye3+ye4+ye5+ye6)/6$$

In this way, the following data is calculated:
the average value B (xb, yb) of the subjective information values A of the one member;
the average value B (xb, yb) of the subjective information values A of each of the other members;
the average value C (xc, yc) of the subjective information values B of all the members;
the average value E (xe, ye) of the objective information values D (xd, yd) of the one member;
the average value E (xe, ye) of the objective information values D (xd, yd) of each of the other members; and
the average F(xf, yf) of the objective information values E (xe, ye) of all the members.

These pieces of data are plotted on the emotion map shown in FIG. 3A and the mood map shown in FIG. 4A by the map generation unit 18.

FIG. 8 shows an example of a feeling/emotion map obtained by plotting the average value B of the subjective information values A of the one member, the average value B of the subjective information values A of each of the other members, and the average value C of the subjective information values B of all the members. The deviation of the average value B of the subjective information values A of the one member from the average value C of the subjective information values B of all the members is shown by a thick arrow.

Similarly, FIG. 9 shows an example of a mood map of all the surrounding members obtained by plotting the average value E of the objective information values D of the one member, the average value E of the objective information values D of each of the other members, and the average F of the objective information values E of all the members. The deviation of the average value E of the objective information values D of the one individual from the average value F of the objective information values E of all the members is shown by a thick arrow.

The states of the one member and the group to which the one member belongs are categorized and determined in accordance with the positions of the pieces of data plotted on the emotion and mood maps. The determination and categorization of the subjective information values of the one member are shown in Table 1 below.

TABLE 1

| Plot Position | State Determination |
| --- | --- |
| When x-axis value xb and y-axis value yb of average value B of subjective information values A of one member are both negative | One member is determined to be anxious |
| When x-axis value xb and y-axis value yb of average value B of subjective information values A of one member are positive and negative, respectively | One member is determined to be dissatisfied or irritated |
| When x-axis value xb and y-axis value yb of average value B of subjective information values A of one member are both positive | One member is determined to be excited |
| When x-axis value xb and y-axis value yb of average value B of subjective information values A of one member are negative and positive, respectively | One member is determined to be relaxed |

The determination and categorization of the subjective information values of all the group members are shown in Table 2 below.

TABLE 2

| Plot Position | State Determination |
| --- | --- |
| When x-axis value xc and y-axis value yc of average value C of subjective information values B of all members are both negative | Group is determined to be anxious |
| When x-axis value xc and y-axis value yc of average value C of subjective information values B of all members are positive and negative, respectively | Group is determined to be dissatisfied or irritated |
| When x-axis value xc and y-axis value yc of average value C of subjective information values B of all members are both positive | Group is determined to be excited |
| When x-axis value xc and y-axis value yc of average value C of subjective information values B of all members are negative and positive, respectively | Group is determined to be relaxed |

The determination and categorization of the objective information values of the one member are shown in Table 3 below.

TABLE 3

| Plot Position | State Determination |
| --- | --- |
| When x-axis value xe and y-axis value ye of average value E of objective information values D of one member are both negative | One member is determined to feel that mood of group is anxious |
| When x-axis value xe and y-axis value ye of average value E of objective information values D of one member are positive and negative, respectively | One member is determined to feel that mood of group is dissatisfied or irritated |
| When x-axis value xe and y-axis value ye of average value E of objective information values D of one member are both positive | One member is determined to feel that mood of group is excited |
| When x-axis value xe and y-axis value ye of average value E of objective information values D of one member are negative and positive, respectively | One member is determined to feel that mood of group is relaxed |

The determination and categorization of the objective information values of all the group members are shown in Table 4 below.

TABLE 4

| Plot Position | State Determination |
| --- | --- |
| When x-axis value xf and y-axis value yf of average value F of objective information values E of all members are both negative | All members are determined to feel that mood of group is anxious |
| When x-axis value xf and y-axis value yf of average value F of objective information values E of all members are positive and negative, respectively | All members are determined to feel that mood of group is dissatisfied or irritated |
| When x-axis value xf and y-axis value yf of average value F of objective information values E of all members are both positive | All members are determined to feel that mood of group is excited |
| When x-axis value xf and y-axis value yf of average value F of objective information values E of all members are negative and positive, respectively | All members are determined to feel that mood of group is relaxed |

As seen above, the feeling of the one member of the group and the feelings of all the members thereof are converted into numerical values on the emotion map and then categorized. Further, the presence or absence of the deviation of feeling of the one member from the feelings of all the members and the degree of the deviation, if any, are shown.

Also, the mood of all the members felt by the one member and the mood of all the members felt by all the members are converted into numerical values on the mood map and then categorized. Further, the presence or absence of the deviation of the mood of all the members felt by the one member from the mood of all the members felt by all the members and the degree of the deviation, if any, are shown.

[1-4] Another Example of Input Screen

Figure 3C:
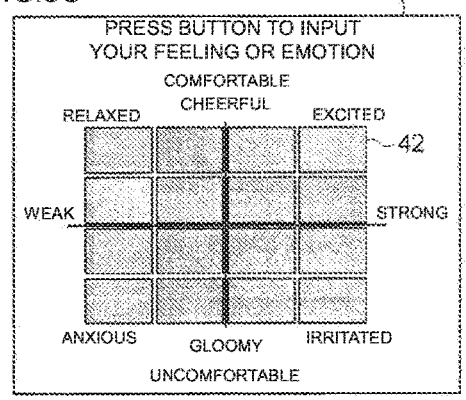
FIG. 3C shows an example of a feeling/emotion data input screen in the emotion/mood data input, display, and analysis device of the first embodiment.

As described above, in the present embodiment, the screen 40 shown in FIG. 3C is used as an example of the feeling/emotion data input screen 6 in the emotion/mood data input, display, and analysis device 2. Also, the screen 50 shown in FIG. 4C is used as an example of the all surrounding member mood data input screen 6 in the emotion/mood data input, display, and analysis device 2. The feeling/emotion data input screen and all surrounding member mood data input screen are not limited thereto.

Figure 6:
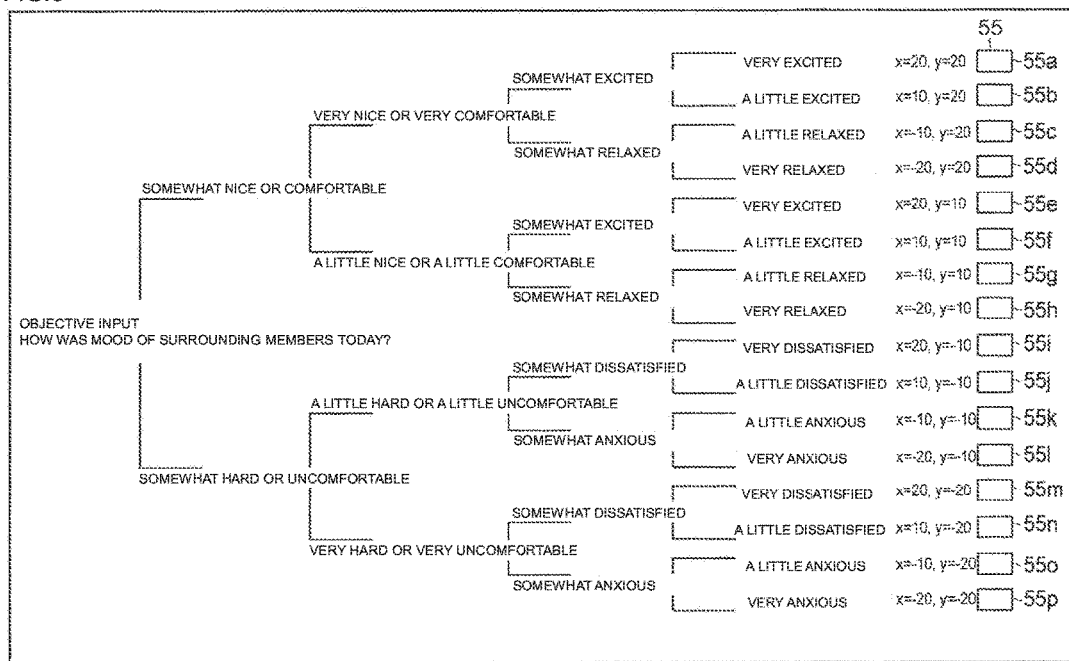
FIG. 6 shows an example of an all surrounding member mood data input screen in the emotion/mood data input, display, and analysis device of the first embodiment.

FIG. 5 shows another example of the feeling/emotion data input screen 6 in the emotion/mood data input, display, and analysis device 2 of the present embodiment. FIG. 6 shows another example of the all surrounding member mood data input screen 6 in the emotion/mood data input, display, and analysis device 2 of the present embodiment.

A tree flow using bifurcation points is shown on the input screen shown in FIG. 5. As the tree proceeds from upper to lower levels, that is, as the flow proceeds from the left to right, whether the emotion is cheerful or gloomy and the level thereof and whether the emotion is strong or weak and the level thereof are selected at bifurcation points. Input buttons 54 are disposed at the lowest ends of the tree, that is, at the right ends of the flow. Accordingly, the input buttons 54 at the lowest ends of the tree, that is, at the right ends of the flow correspond to 16 input buttons 42 shown in FIG. 3C [and FIG. 3B]. Accordingly, input operations using the input buttons 42 shown in FIG. 3C are equivalent to input operations using the input button 54 at the lowest ends of the tree, that is, at the right ends of the flow.

Similarly, a tree flow using bifurcation points is shown on an input screen shown in FIG. 6. As the tree proceeds from upper to lower levels, that is, as the flow proceeds from the left to right, whether the mood is cheerful or gloomy and the level thereof and whether the emotion is strong or weak and the level thereof are selected at bifurcation points. Input buttons 55 are disposed at the lowest ends of the tree, that is, at the right ends of the flow. Accordingly, the input buttons 55 at the lowest ends of the tree, that is, at the right ends of the flow correspond to the 16 input buttons 52 shown in FIG. 4C [and FIG. 4B]. Accordingly, input operations using the input buttons 52 shown in FIG. 4C are equivalent to input operations using the input buttons 55 at the lowest ends of the tree, that is, at the right ends of the flow.

FIG. 7A and B show multiple screens formed from the tree flow using bifurcation points shown in FIG. 5, and selection buttons are disposed on the screens. For example, a question "subjective input/how were you today?" and options "somewhat nice or comfortable" and "somewhat hard or uncomfortable" shown at the left end of the tree flow using bifurcation points shown in FIG. 5 are shown on the screen shown in FIG. 7A.

If "somewhat nice or comfortable (A)" is selected at the left end of the tree flow using bifurcation points shown in FIG. 5, the flow proceeds to options "very nice or very comfortable (B)" and "a little nice or a little comfortable." These contents are shown on the screen shown in FIG. 7B.

If "somewhat nice or comfortable (A)" and "very nice or very comfortable(B)" are selected on the tree flow using bifurcation points shown in FIG. 5, the flow proceeds to options "somewhat excited (C)" and "somewhat relaxed." These contents are shown on the screen shown in FIG. 7C.

Further, if "somewhat nice or comfortable (A)," "very nice or very comfortable (B)," and "somewhat excited (C)" are selected on the tree flow using bifurcation points shown in FIG. 5, the flow proceeds to options "very excited (D)" and "a little excited." These contents are shown on the screen shown in FIG. 7D.

As seen above, the feeling/emotion data input screen and all surrounding member mood data input screen in the emotion/mood data input, display, and analysis device 2 of the present embodiment can be generated as shown in FIGS. 5, 6, and 7.

[1-5]Summary

An emotion/mood data input, display, and analysis device of the present embodiment includes a controller, a display, an input unit, and a recording unit. The controller includes an input screen generation unit. The input screen generation unit generates a first input screen that allows each of multiple members forming a group to, as an inputter, input whether his or her emotion or feeling is cheerful or gloomy and the level thereof and the whether the emotion or feeling is strong or weak and the level thereof in a bifurcated manner. The display displays the first input screen. The controller captures data through the first input screen displayed on the display and the input unit and records the data in the recording unit.

The first input screen has a first plane having a first axis and a second axis. In the first plane, whether the emotion of the inputter is cheerful or gloomy and the level thereof are developed along the first axis, and whether the emotion of the inputter is strong or weak and the level thereof are developed along the second axis.

In the emotion/mood data input, display, and analysis device of the present embodiment, the controller further includes a data operation unit that performs an arithmetic operation on the data inputted through the first input screen and the input unit and the data recorded in the recording unit and a map generation unit that generates a first output screen to be displayed on the display, on the basis of data resulting from the arithmetic operation by the data operation unit. The data operation unit calculates a first average value about data inputted by each member in a predetermined period and a second average value about the group to which the members belong, in the predetermined period. The map generation unit generates the first output screen that uses the first plane as a plane for displaying the first and second average values.

An emotion/mood data input, display, and analysis device of the present embodiment includes a controller, a display, an input unit, and a recording unit. The controller includes an input screen generation unit. The input screen generation unit generates a second input screen that allows each of multiple members forming a group to, as an inputter, input whether the mood of the group felt by him or her is cheerful or gloomy and the level thereof and whether the mood is strong or weak and the level thereof in a bifurcated manner. The display displays the second input screen. The controller captures data through the second input screen displayed on the display and the input unit and records the data in the recording unit.

The second input screen has a second plane having a first axis and a second axis. In the second plane, whether the mood received by the inputter is cheerful or gloomy and the level thereof are developed along the first axis, and whether the mood received by the inputter is strong or weak and the level thereof are developed along the second axis.

In the emotion/mood data input, display, and analysis device of the present embodiment, the controller further includes a data operation unit that performs an arithmetic operation on the data inputted through the second input screen and the input unit and the data recorded in the recording unit and a map generation unit that generates a second output screen to be displayed on the display, on the basis of data resulting from the arithmetic operation by the data operation unit. The data operation unit calculates a third average value about data inputted by each member in a predetermined period and a fourth average value about the group to which the members belong, in the predetermined period. The map generation unit generates the second output screen that uses the second plane as a plane for displaying the third and fourth average values.

The emotion/mood data input, display, and analysis device of the present embodiment can objectify and record the feeling of each member of a group or team and the mood of all the members felt by each member. Also, the emotion/mood data input, display, and analysis device of the present embodiment can objectify and visually represent the feeling of each member of a group or team and the mood of all the members felt by each member.

Second Embodiment

[2-1] Configuration of Emotion/Mood Data Input, Display, and Analysis Device

FIG. 10 is a block diagram of an emotion/mood data input, display, and analysis device of a second embodiment. The emotion/mood data input, display, and analysis device of the second embodiment has approximately the same configuration as the emotion/mood data input, display, and analysis device of the first embodiment. For this reason, the same elements are given the same reference signs and will not be described, and the difference therebetween will be mainly described.

As with the emotion/mood data input, display, and analysis device of the second embodiment shown in FIG. 1, an emotion/mood data input, display, and analysis device 2 of the second embodiment shown in FIG. 10 includes a controller 3, a display 4, an input unit 12, a recording unit 14, a communication interface 60, and an external device interface 62. Further, it includes an optimum program presentation unit 22. The controller includes an input screen generation unit 10, a data operation unit 16, and a map generation unit 18, as well as an optimum program determination unit 20.

The optimum program determination unit 20 shown in FIG. 10 determines (selects), for each member, an optimum program for leading his or her emotion or feeling to relaxation, such as text, voice, or moving images, on the basis of (numerical) feelings or emotions of all members and (numerical) moods felt by all the members displayed on emotion and mood maps.

The optimum program presentation unit 22 presents the user with the optimum program selected (determined) by the optimum program determination unit 20, for example, in the form of text, voice, moving images, or the like. If the optimum program is voice, the optimum program presentation unit 22 consists of an audio device such as a speaker. In this case, the voice serving as the optimum program may be music (e.g., classic music) presented to multiple members, or may be voice counseling for a single member or multiple members. If the optimum program is text or moving images, the display 4 may serve also as the optimum program presentation unit 22. The optimum program may be recorded in the recording unit 14, or may be captured from the outside through the external network 66.

[2-2] Operation of Optimum Program Determination Unit

The optimum program determination unit 20 can make various types of determinations (selections). An example of a determination (selection) operation will be described below. The operation of the optimum program determination unit 20 below is shown in flowcharts of FIGS. 14 and 15.

The flowchart of FIG. 14 shows an operation for determining (selecting), for each member, an optimum program for leading his or her feeling or emotion to relaxation, on the basis of numerical feelings or emotions of all members displayed on an emotion map. The flowchart of FIG. 15 shows an operation for determining (selecting), for each member, an optimum program for leading his or her sensitivity to relaxation, on the basis of the numerical moods felt by all members displayed on a mood map.

[2-2-1] Determination (Selection) Based on Display on Emotion Map

[2-2-1-1] A case in which xb and yb of the average value B of the subjective information values A of one member are both negative, that is, fall within an "anxious" range (xb<0, yb<0) and in which a value obtained by subtracting the xc value of the average value C of the subjective information values B of all the members from the xb value of the average value B of the subjective information values A of the one member is equal to or smaller than a threshold of, for example, −20 to 0 (xb−xc<−20 to 0) (YES in ST02 of FIG. 14).

In this case, it is determined that the one member is more likely to become anxious in the group. In other words, it is determined that the one member "expresses an anxious feeling as a word or deed and expresses the mood exaggeratedly." For this reason, the optimum program determination unit 20 presents the one member, who is a user, with an optimum program including learning or guidance for eliminating the anxious state through the optimum program presentation unit 22 (ST04 in FIG. 14). As described above, the optimum program may be, for example, text, voice (including music), or moving images (the same applies hereinafter).

Figure 11:
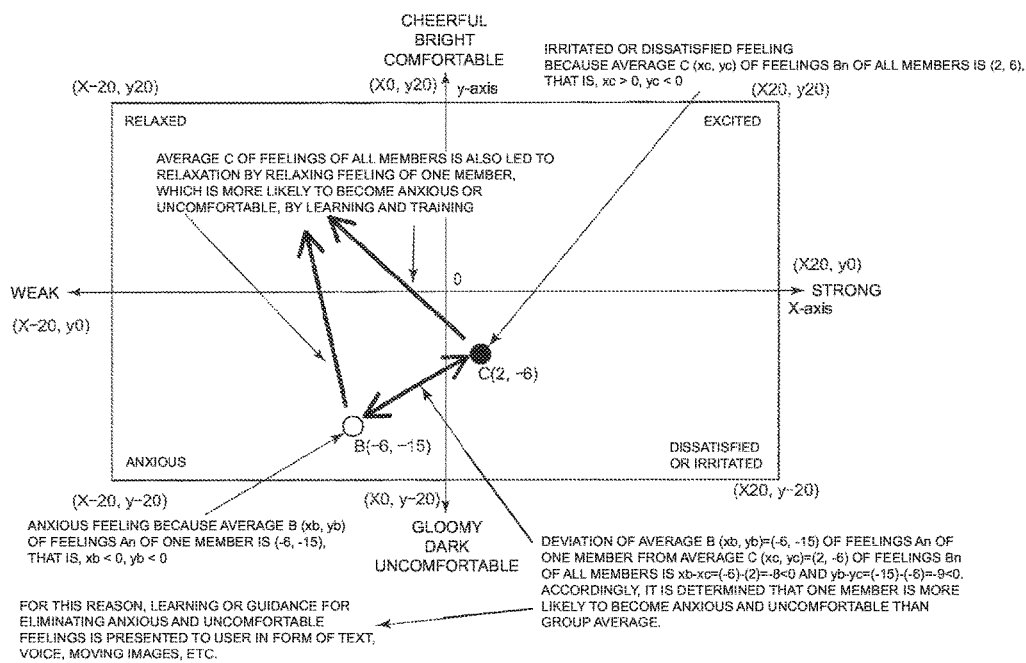
FIG. 11 shows an example of an emotion map.

FIG. 11 shows an example of an emotion map indicating the state of the above [2-2-1-1]. This emotion map shows that the emotion of the entire group is led to relaxation by relaxing the emotion of the user using the optimum program.

[2-2-1-2] A case in which xb and yb of the average value B of the subjective information values A of one member are positive and negative, respectively, that is, fall within a "dissatisfied or irritated" range (xb>0, yb<0) and in which a value obtained by subtracting the xc value of the average value C of the subjective information values B of all the members from the xb value of the average value B of the subjective information values A of the one member is equal to or greater than a threshold of, for example, 0 to 20, (xb−xc>0 to 20) (YES in ST06 of FIG. 14).

In this case, it is determined that the one member is more likely to become dissatisfied or irritated in the group. In other words, it is determined that the one member "expresses a dissatisfied feeling as a word or deed and expresses the mood exaggeratedly." For this reason, the optimum program determination unit 20 presents the one member, who is a user, with an optimum program including learning or guidance for eliminating the irritated or dissatisfied state through the optimum program presentation unit 22 (ST08 in FIG. 14).

Figure 12:
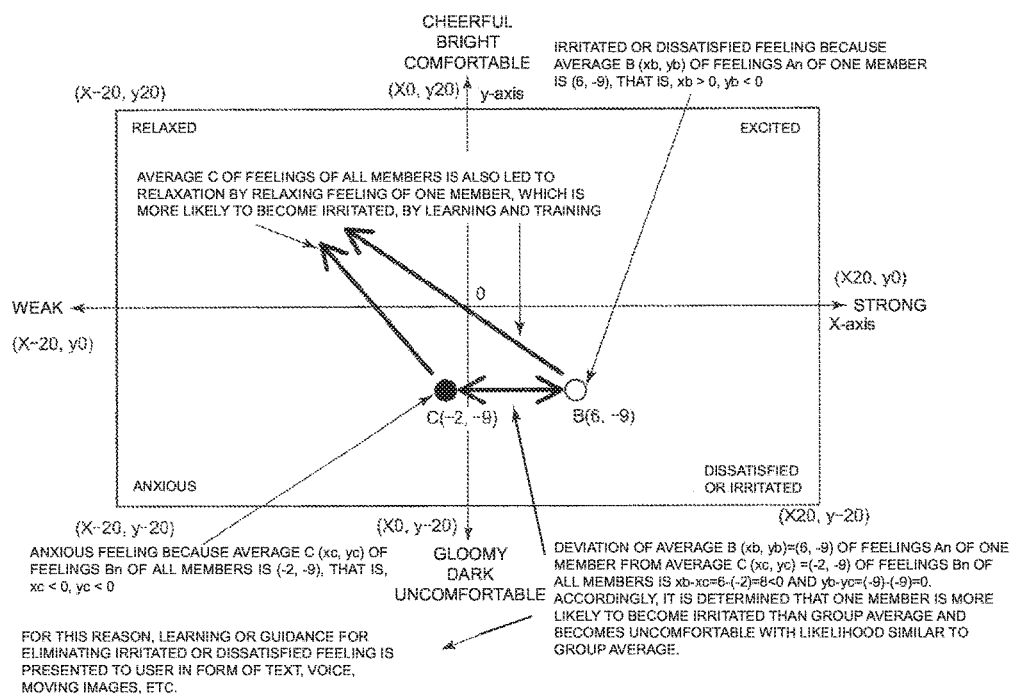
FIG. 12 shows an example of an emotion map.

FIG. 12 shows an example of an emotion map indicating the state of the above [2-2-1-2]. This emotion map shows that the emotion of the entire group is led to relaxation by relaxing the emotion of the user using the optimum program.

[2-2-1-3] A case in which xb and yb of the average value B of the subjective information values A of one member are positive and positive, respectively, that is, fall within an "excited" range (xb>0, yb>0) and in which a value obtained by subtracting the xc value of the average value C of the subjective information values B of all the members from the xb value of the average value B of the subjective information values A of the one member is equal to or greater than a threshold of, for example, 0 to 20 (xb−xc>0 to 20) (YES in ST10 of FIG. 14).

In this case, it is determined that the one member is more likely to become excited in the group. In other words, it is determined that the one member "expresses an excited feeling as a word or deed and expresses the mood exaggeratedly." For this reason, the optimum program determination unit 20 presents the one member, who is a user, an optimum program including learning or guidance for eliminating the excited state through the optimum program presentation unit 22 (ST12 in FIG. 14).

[2-2-1-4] In addition to the above [2-2-1-1] to [2-2-1-3], cases in which the average value B of the subjective information values A of one member falls within a range other than a "relaxed" range (xb<0, yb<0, or xb>0, yb<0, or xb>0, yb>0) (NO in ST14 of FIG. 14).

If the average value C of the subjective information values B of all the members falls within an "anxious" range (xc<0, yc<0) (YES in ST16 of FIG. 14), the optimum program determination unit 20 presents the one member, who is a user, a program for learning the understanding of, and the sympathy with anxious individuals through the optimum program presentation unit 22 (ST18 in FIG. 14).

If the average value C of the subjective information values B of all the members falls within the "dissatisfied or irritated" range (xc>0, yc<0) (YES in ST20 of FIG. 14), the optimum program determination unit 20 presents the one member, who is a user, a program for learning the understanding of, and the sympathy with irritated individuals through the optimum program presentation unit 22 (ST22 in FIG. 14).

If the average value C of the subjective information values B of all the members falls within the "excited" range (xc>0, yc>0) (YES in ST24 of FIG. 14), the optimum program determination unit 20 presents the one member, who is a user, a program for learning the understanding of, and the sympathy with excited individuals through the optimum program presentation unit 22 (ST26 in FIG. 14).

[2-2-2] Determination (Selection) Based on Display on Mood Map

[2-2-2-1] A case in which xe and ye of the average value E of objective information values D of one member are both negative, that is, fall within an "anxious" range (xe<0, ye<0) and in which a value obtained by subtracting the xf value of the average value F of the objective information values E of all the members from the xe value of the average value E of the objective information values D of the one member is equal to or smaller than a threshold of, for example, −20 to 0 (xe−xf<−20 to 0) (YES in ST52 of FIG. 15).

In this case, it is determined that the one member is more likely to feel that the surrounding members look anxious in the group. In other words, it is determined that the one member "expresses anxiety as a word or deed and expresses the mood exaggeratedly." For this reason, the optimum program determination unit 20 presents the one member, who is a user, with an optimum program including learning or guidance for reducing excess sensitivity to the anxiety of surrounding members through the optimum program presentation unit 22 (ST54 in FIG. 15).

[2-2-2-2] A case in which xe and ye of the average value E of the objective information values D of one member are positive and negative, respectively, that is, fall within a "dissatisfied or irritated" range (xe>0, ye<0) and in which a value obtained by subtracting the xf value of the average value F of the objective information values E of all the members from the xe value of the average value E of the objective information values D of the one member is equal to or greater than a threshold of, for example, 0 to 20 (xe−xf>0 to 20) (YES in ST56 of FIG. 15).

In this case, it is determined that the one member is more likely to feel that the surrounding members are dissatisfied or irritated in the group. In other words, it is determined that the one member "expresses a dissatisfied feeling as a word or deed and expresses the mood exaggeratedly." For this reason, the optimum program determination unit 20 presents the one member, who is a user, with an optimum program including learning or guidance for reducing excess sensitivity to irritation or dissatisfaction of surrounding members through the optimum program presentation unit 22 (ST58 in FIG. 15).

Figure 13:
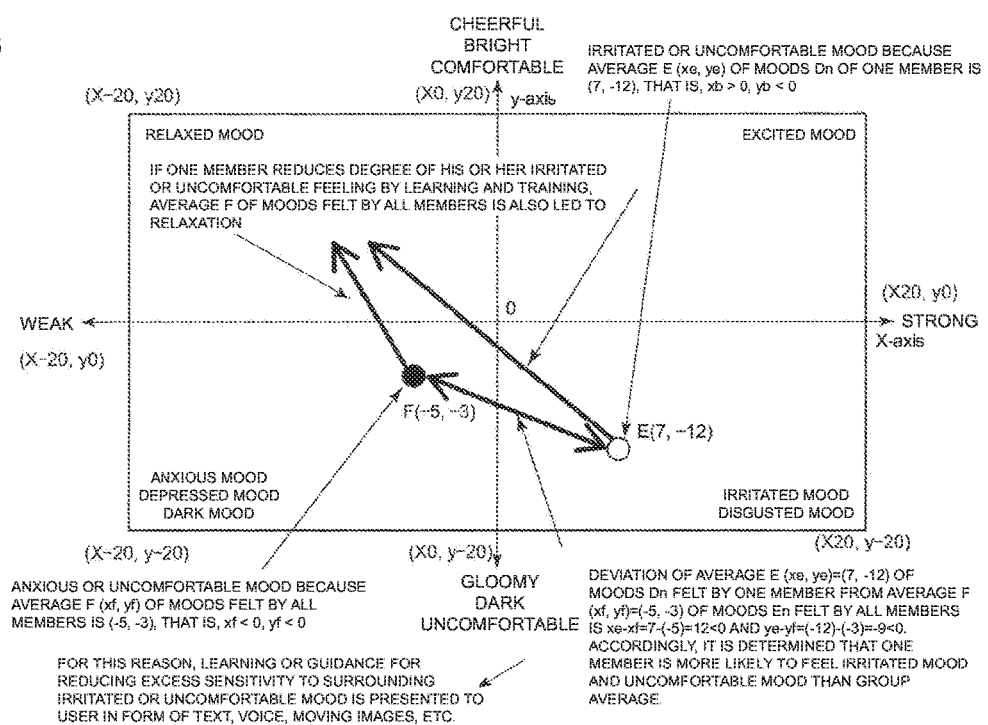
FIG. 13 shows an example of a mood map.

FIG. 13 shows an example of a mood map indicating the state of the above [2-2-2-2]. This mood map shows that if the user becomes more likely to feel a relaxed mood thank to the optimum program, the moods felt by all the group members are led to relaxation.

[2-2-2-3] A case in which xe and ye of the average value E of the objective information values D of one member are both positive, that is, fall within an "excited" range (xe>0, ye>0) and in which a value obtained by subtracting the xf value of the average value F of the objective information values E of all the members from the xe value of the average value E of the objective information values D of the one member is equal to or greater than a threshold of, for example, 0 to 20 (xe−xf>0 to 20) (YES in ST60 of FIG. 15).

In this case, it is determined that the one member is more likely to feel that the surrounding members are excited in the group. In other words, it is determined that the one member "expresses an excited feeling as a word or deed and expresses the mood exaggeratedly." For this reason, the optimum program determination unit 20 presents the one member, who is a user, with an optimum program including learning or guidance for eliminating the excess sensitivity to the excitation of surrounding members through the optimum program presentation unit 22 (ST62 in FIG. 15).

[2-2-2-4] In addition to the above [2-2-2-2] to[2-2-2-3], cases in which the average value E of the objective information values D of one member falls within a "relaxed" range (xe<0, ye>0) (YES in ST64 of FIG. 15).

If the average value F of the objective information values E of all the members falls within an "anxious" range (xf<0, yf<0) (YES in ST66 of FIG. 15), the optimum program determination unit 20 presents the one member, who is a user, with a program for learning the understanding of, and the sympathy with anxious individuals through the optimum program presentation unit 22 (ST68 in FIG. 15).

If the average value F of the objective information values E of all the members falls within a "dissatisfied or irritated" range (xf>0, yf<0) (YES in ST70 of FIG. 15), the optimum program determination unit 20 presents the one member, who is a user, with a program for learning the understanding of, and the sympathy with irritated individuals through the optimum program presentation unit 22 (ST72 in FIG. 15).

If the average value F of the objective information values E of all the members falls within the "excited" range (xf>0, yf>0) (YES in ST74 of FIG. 15), the optimum program determination unit 20 presents the one member, who is a user, with a program for learning the understanding of, and the sympathy with excited individuals through the optimum program presentation unit 22 (ST76 in FIG. 15).

[2-3] Summary

In the emotion/mood data input, display, and analysis device of the present embodiment, the controller further includes the optimum program determination unit that determines a program to be learned by each member, on the basis of first and second average values. The emotion/mood data input, display, and analysis device further includes the optimum program presentation unit that presents the optimum program determined by the optimum program determination unit.

The emotion/mood data input, display, and analysis device of the present embodiment can automatically determine the feeling of each member of a group and whether each member is excessively sensitive, or insensitivity, on the basis of the objectified feeling of each member and the mood of all the members felt by each member and can automatically present a program for eliminating the excess sensitivity or insensitivity, if any, on the basis of the determination.

Other Embodiments

[Input of Conscious Word or Deed]

Figure 18:
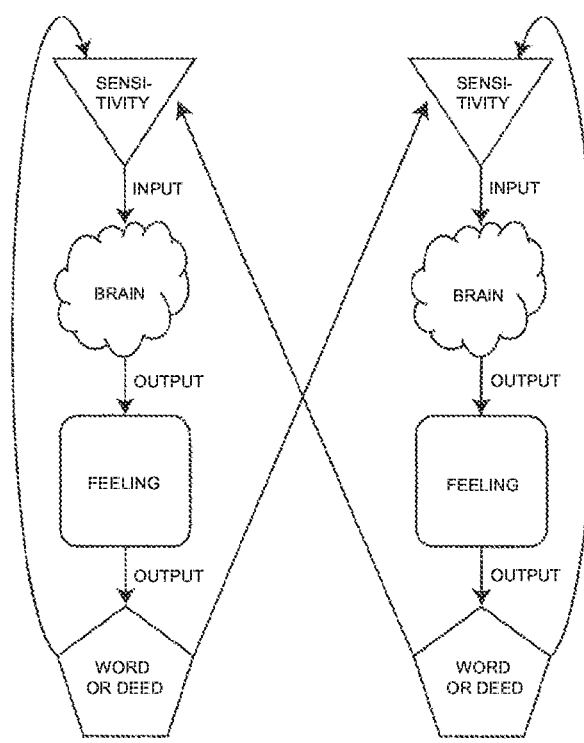
FIG. 18 is a schematic diagram showing that the brain of one member receives not only words or deeds of other members but also his or her own word or deed through his or her sensitivity.

As shown in FIG. 18, the brain of one member (an individual) of a group receives, through his or her sensitivity, not only words or deeds of other members or the mood thereof but also his or her own word or deed. For example, a vehement word or deed of the one member is inputted not only to the brains of other members but also to his or her brain through his or her sensitivity. Thus, his or her feeling may be destabilized.

An individual can manage (control) his or her conscious word or deed on his or her own. For this reason, the individual may use the mood data screen 50 shown in FIG. 4C as a screen for converting his or her conscious word or deed into a numerical value and inputting it periodically. By displaying, on the map screen shown in FIG. 4A, the average value of the numerical values inputted based on his or her conscious words or deeds in a predetermined period, the individual can generate his or her own conscious word/deed map. Thus, the individual (inputter) can check his or her own conscious words or deeds objectively and visually.

If all the group members convert their conscious words or deeds into numerical values and input them periodically using the screen 50 shown in FIG. 4C, the average values of the numerical values based on their words or deeds in a predetermined period are displayed on the map screen shown in FIG. 4A. Thus, the group members can generate maps of their conscious words or deeds. In this case, any of data about each group member and data about the average of all the group members can be displayed.

Figure 19:
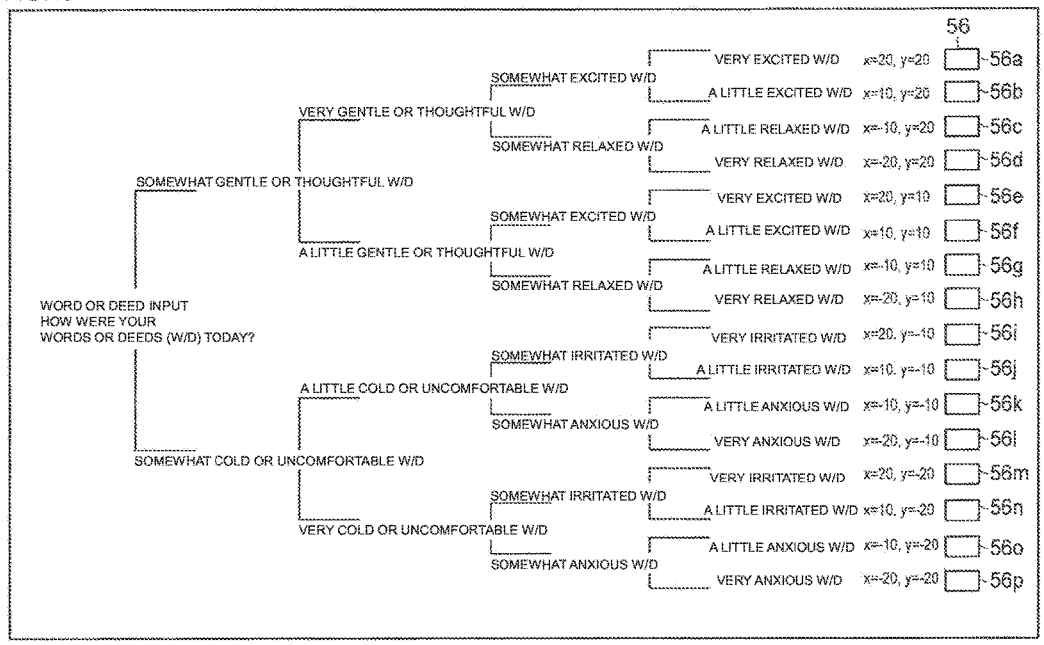
FIG. 19 shows an example of a data input screen that allows an inputter to convert his or her conscious word or deed into a numerical value, in the emotion/mood data input, display, and analysis device of the first embodiment.

FIG. 19 shows another example of a screen 6 for converting conscious words or deeds of each member into numerical values and inputting them periodically, in an emotion/mood data input, display, and analysis device 2 of another embodiment. As with the input screens shown in FIGS. 5 and 6, an input screen shown in FIG. 19 shows a tree flow using bifurcation points. As the tree proceeds from upper to lower levels, that is, as the flow proceeds from the left to right, each member makes selections as to whether his or her word or deed is cheerful or gloomy and the level thereof and whether the word or deed is strong or weak and the level thereof at bifurcation points. Input buttons 56 are disposed at the lowest ends of the tree, that is, at the right ends of the flow. For example, the input buttons 56 at the lowest ends of the tree, that is, at the right ends of the flow approximately correspond to the 16 input buttons 52 shown in FIG. 4C [and FIG. 4B].

An optimum program determination unit 20 may be configured to determine an optimum program for leading the feeling or emotion of each member to relaxation, on the basis of data obtained by converting feelings of each member and all the members into numerical values and inputting them and data obtained by converting conscious words or deeds of each member and all the members into numerical values and inputting them. By leading the sensitivity or feeling of each member to relaxation, it is possible to lead unconscious words or deeds of each member to relaxation or to lead the sensitivity or feelings of all the members to relaxation.

[Output of Operation Data]

In the first and second embodiments, the map generation unit 18 of the controller (processor) 3 generates a map (an emotion map, a mood map) 8 on the basis of data resulting from an arithmetic operation by the data operation unit 16 and displays (outputs) the map on the display 4. In this case, the outputted "map" appeals to vision. On the other hand, the map generation unit 18 may generate a "map" that appeals to hearing.

The "map" of the first and second embodiments that appeals to vision has the y-axis that indicates whether emotions or moods are cheerful or gloomy and the x-axis that indicates whether emotions and moods are strong or weak. On the other hand, the map (emotion map, mood map) of the present disclosure can be represented by sound, for example, as follows: the map generation unit 18 of the controller (processor) 3 generates sound so that the cheerfulness or gloominess of emotions and moods correspond to the pitch of sound and the strength or weakness of emotions and moods correspond to the loudness of sound and then outputs the sound from an output unit such as a speaker. The two parameters (pitch and loudness) of the sound outputted from the map generation unit 18 correspond to the cheerfulness or gloominess of emotions and moods and the strength or weakness of emotions and moods as two-dimensional variables.

If the map generation unit 18 outputs sound as a map from an output unit such as a speaker, the sound "map" as a feedback can be provided to many members of the group simultaneously. Further, by using the external network 66, the sound "map" as a feedback can be also simultaneously provided to group members who are present in distant places.

Further, the map (emotion map, mood map) of the present disclosure can be represented by light (colored light) as follows: the map generation unit 18 of the controller (processor) 3 generates light so that the cheerfulness or gloominess of emotions and moods correspond to the chroma (high chroma, low chroma) of color and the strength or weakness of emotions and moods correspond to the lightness of color and then outputs the light from the display 4. The two parameters (chroma, lightness) of light outputted from the map generation unit 18 correspond to the cheerfulness or gloominess of emotions and moods and the strength or weakness of emotions and moods as two-dimensional variables.

The "map" created by the map generation unit 18 may be a combination of a map that appeals to vision and a map that appeals to hearing. Specifically, the map generation unit 18 may combine all of the graph "map" shown in FIGS. 3A-C or 4A-D, the above sound "map," and the above light "map" and then output the combination, or may select and combine some thereof and then output the combination. The "map" generated by the map generation unit 18 may be a map that appeals to any other sense such as touch or taste, or may be a combination of such a map and a map which appeals to vision or hearing.

[Use of External Server]

The input screen generation unit 10, recording unit 14, data operation unit 16, map generation unit 18, or optimum program determination unit 20 may be included in an external server (not shown) different from the device 2 that includes the display 4 and optimum program presentation unit 22. Further, there may be an embodiment in which such an external server is connected to multiple devices 2 of the present disclosure that each include a display 4 and an optimum program presentation unit 22, through the external network 66. By carrying out such an embodiment, the users of the devices 2 which are present in distant places can input data at any time and can be presented with an optimum program at any time.

REFERENCE SIGNS LIST

2 . . . emotion/mood data input, display, and analysis device
3 . . . controller (processor)
4 . . . display
6 . . . input screen
10 . . . input screen generation unit
12 . . . input unit
14 . . . recording unit
16 . . . data operation unit
18 . . . map generation unit
20 . . . optimum program determination unit
22 . . . optimum program presentation unit

The invention claimed is:
1. A data input, display, and analysis device comprising:
a controller;
a display;
an input unit;
a recording unit,
wherein the controller comprises an input screen generation unit,
the input screen generation unit generates a first input screen that allows each of a plurality of members forming a group to, as an inputter, input whether an emotion or feeling of the each member is cheerful or gloomy, a level of cheerfulness or gloominess, whether the emotion or feeling is strong or weak, and a level of strength or weakness in a bifurcated manner,
the display displays the first input screen,
the controller captures data through the first input screen displayed on the display and the input unit and records the data in the recording unit,
the first input screen has a first plane having first and second axes,
in the first plane, whether an emotion of an inputter is cheerful or gloomy and a level of cheerfulness or gloominess are developed along the first axis, and whether the emotion of the inputter is strong or weak and a level of strength or weakness are developed along the second axis,
the controller further comprises a data operation unit configured to perform an arithmetic operation on the data inputted through the first input screen and the input unit and the data recorded in the recording unit;
a map generation unit configured to generate a first output screen to be displayed on the display, on the basis of data resulting from the arithmetic operation by the data operation unit,
the data operation unit calculates a first average value about input data of the each member of the group in a predetermined period and a second average value about the group to which the members belong, in the predetermined period, and
the map generation unit generates the first output screen that uses the first plane as a plane for displaying the first average value and the second average value, and
the controller further comprises an optimum program determination unit configured to determine a program to be learned by the each member, on the basis of the first and second average values,
the optimum program determination unit configured to compare the first and second average values to a predetermined threshold to determine the optimum program,
the data input, display, and analysis device further comprising,
an optimum program presentation unit configured to present the optimum program determined by the optimum program determination unit.

2. A data input, display, and analysis device comprising:
a controller;
a display;
an input unit;
a recording unit,
wherein the controller comprises an input screen generation unit,
the input screen generation unit generates a first input screen that allows each of a plurality of members forming a group to, as an inputter, input whether a mood of the group felt by the each member cheerful or gloomy, a level of cheerfulness or gloominess, whether the mood is strong or weak, and a level of strength or weakness in a bifurcated manner,
the display displays the first input screen,
the controller captures data through the first input screen displayed on the display and the input unit and records the data in the recording unit, the first input screen has a first plane having first and second axes, in the first plane, whether a mood received by an inputter is cheerful or gloomy and a level of cheerfulness or gloominess are developed along the first axis, and whether the mood received by the inputter is strong or weak and a level of strength or weakness are developed along the second axis, the controller further comprises a data operation unit configured to perform an arithmetic operation on the data inputted through the first input screen and the input unit and the data recorded in the recording unit; and a map generation unit configured to generate a first output screen to be displayed on the display, on the basis of data resulting from the arithmetic operation by the data operation unit, the data operation unit calculates a first average value about input data of the each member of the group in a predetermined period and a second average value about the group to which the members belong, in the predetermined period, and the map generation unit generates the first output screen that uses the first plane as a plane for displaying the first average value and the second average value, and the controller further comprises an optimum program determination unit configured to determine a program to be learned by the each member, on the basis of the first and second average values, the optimum program determination unit configured to compare the first and second average values to a predetermined threshold to determine the optimum program, the data input, display, and analysis device further comprising, an optimum program presentation unit configured to present a determined optimum program.

* * * * *